J. F. BURNS.
ELECTRIC INSULATING FITTING.
APPLICATION FILED MAR. 22, 1911.
1,088,402.
Patented Feb. 24, 1914.
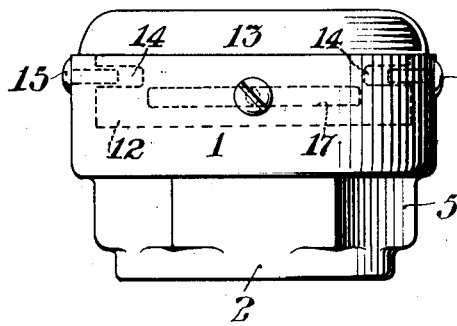
FIG. I.
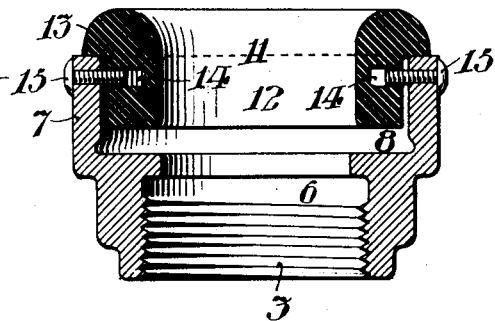
FIG. II.
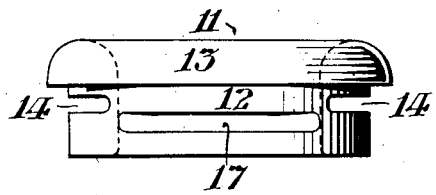
FIG. III.
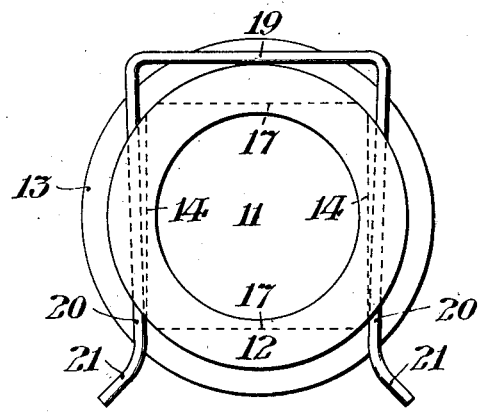
FIG. IV.
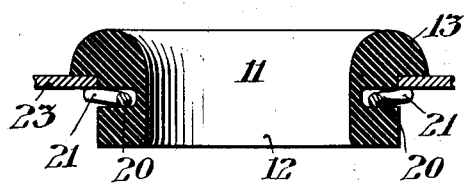
FIG. V.
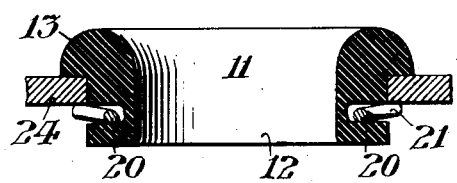
FIG. VI.
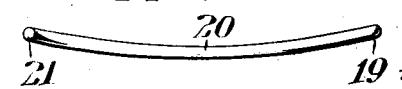
FIG. VII.
WITNESSES:
Philip W. Lessey.
James McCabe.
INVENTOR:
James F. Burns
by Arthur E. Paige
Attorney.

UNITED STATES PATENT OFFICE.

JAMES F. BURNS, OF PHILADELPHIA, PENNSYLVANIA.

ELECTRIC INSULATING-FITTING.

1,088,402.  Specification of Letters Patent.  Patented Feb. 24, 1914.

Application filed March 22, 1911. Serial No. 616,053.

*To all whom it may concern:*

Be it known that I, JAMES F. BURNS, of Philadelphia, in the State of Pennsylvania, have invented a certain new and useful Improvement in Electric Insulating-Fittings, whereof the following is a specification, reference being had to the accompanying drawing.

It is the object of my invention to provide an insulating outlet bushing for electric conduits, terminal boxes, etc., so constructed and arranged that the same pattern of bushing is adapted to be fitted in a cap at the end of a conduit and in openings in walls of terminal boxes of different thicknesses.

As hereinafter described, an essential feature of my invention is an annulus of porcelain or other suitable ceramic having a tubular body portion adapted to fit in the opening which is to be bushed in either a conduit cap or plane plate, and having an annular flange overlapping such opening; said body portion having peripheral recesses in different positions with respect to its length, and adapted to engage removable fastening means. As hereinafter described, such fastening means includes a spring clip which is resiliently flexible both in the direction of the length of said tube and transversely with respect thereto.

My invention includes the various novel features of construction and arrangement hereinafter more definitely specified.

In the drawings: Figure I is a side elevation of a conduit cap conveniently embodying my invention. Fig. II is a central longitudinal sectional view of said cap. Fig. III is a side elevation of the bushing shown in Figs. I and II. Fig. IV is an inner face view of said bushing with a spring clip connected therewith. Fig. V is a central longitudinal sectional view of said bushing and clip in engagement with a thin plane plate. Fig. VI is a view similar to Fig. V but showing said bushing and clip engaging a thicker plate. Fig. VII is a side elevation of the clip shown in Figs. IV, V and VI.

As shown in Figs. I and II, the conduit cap 1 includes the cylindrical tubular portion 2 having the internal screw thread 3 adapted for engagement with the corresponding thread on an ordinary electric conduit pipe, and, said cylindrical tube 2 has the hexagonal enlargement 5 affording a wrench hold whereby the cap may be rotated. Said cap 1 has the internal circumferential flange 6, the internal diameter of which corresponds with the internal diameter of the pipe which is fitted to engage said screw thread 3, and overhangs the inner end of said pipe so as to prevent the sharp edge of said pipe from abrading electric conductors drawn through said cap into said pipe. Said cap also has the cylindrical tubular flange 7 in concentric relation with said tube 2, but of larger diameter than the latter so as to afford an internal recess 8 for the bushing 11. Said recess receives the cylindrical tubular bushing body 12, the internal diameter of which is substantially equal to the internal diameter of the flange 6 in the cap 1. Said bushing 11 has its outer end rounded and merging into the circumferential flange 13 which overlaps the opening in the outer end of the cap 1. Said bushing is provided with diametrically opposite recesses 14 to receive the screws 15 or other attaching means. As shown in the several figures, said recesses 14 are diametrically opposite parallel grooves, and, similar diametrically opposite parallel grooves 17 are provided in the tubular body 12 of said bushing at a greater distance from said flange 13 than said grooves 14, and at right angles to the latter. Such bushings 11 being thus adapted to be detachably retained in conduit caps such as above described, are also adapted to be detachably retained in openings in wall plates of the several different thicknesses which are ordinarily employed in junction boxes, switch boxes, and other casings for electric terminals; means being provided to engage the respective peripheral recesses 14 or 17 in accordance with the thickness of such plates. In order to engage such a bushing in wall plates, I find it convenient to employ the spring clip comprising the straight bar 19 and opposite limbs 20, conveniently formed of cylindrical wire. Said limbs 20 extend in such relation with each other that they must be separated to an abnormal extent in opposition to their spring pressure when fitted in said grooves 14 or 17, so that the pressure of said clip upon the bushing 11 normally prevents its displacement with respect thereto. To facilitate the engagement of said clip with respect to said bushing, the ends 21 of the clip are bent outwardly as shown in Fig. IV. Moreover, said clip limbs 20 extend in curved form as shown in Fig VII so that when fitted in said grooves 14 or 17, its cross bar 19 and ends 21 are offset with respect thereto as indicated in Figs. V and VI, so as to bear upon the respective plane plates 23 and 24 and hold said bushing flange 13 against the face thereof.

Although I have shown and described a bushing with two sets of diametrically opposite recesses at different regions of its length; it is to be understood that any desired number or arrangement of recesses for attaching means may be employed, provided that such recesses are disposed in different regions with respect to the length of the portion of the bushing to be inserted in the opening to be bushed, so as to afford means for detachably engaging said bushing at different regions of its length.

I do not desire to limit myself to the precise details of construction and arrangement above described, as it is obvious that various modifications may be made therein without departing from the essential features of my invention as defined in the appended claims.

I claim:—

1. The combination with an electric insulating bushing having a cylindrical tubular body with an external circumferential flange at one end thereof and peripheral recesses; said recesses being diametrically opposite parallel grooves; of a spring clip comprising a straight bar and opposite limbs of cylindrical wire having outwardly bent ends; said limbs being curved transversely with respect to the plane of the clip; whereby said clip is resiliently flexible in the direction of the length of said bushing and transversely with respect thereto, and, when engaged in said recesses, projects at opposite ends thereof in offset relation thereto, said recesses being arranged in alternate pairs in transverse relation to each other.

2. An electric insulating bushing, including a tube having in its perimeter a plurality of grooves extending transversely with respect to its axis, arranged in staggered relation, and spaced less than the width of one groove apart, and, a spring clip arranged to engage diametrically opposite grooves on said tube, at intervals less than the width of one groove, said clip being curved and flexible axially with respect to said tube; whereby said bushing may be secured and adjusted to an extent less than the axial distance between said grooves.

3. An electric insulating bushing, including a tube having in its perimeter a plurality of grooves extending transversely with respect to its axis, arranged in staggered relation, and spaced less than the width of one groove apart, and, means arranged to engage said grooves at intervals less than the width of one groove.

In testimony whereof, I have hereunto signed my name at Philadelphia, Pennsylvania, this twentieth day of March, 1911.

JAMES F. BURNS.

Witnesses:
FRANK L. ALBERT,
CLARENCE W. SHICK.